3,575,784
BONDED NONWOVEN SHEET
Brian R. Phillips and Richard D. Hutchins, Wilmington, Del., assignors to E. I. du Pont de Nemours and Company, Wilmington, Del.
No Drawing. Filed Feb. 28, 1969, Ser. No. 803,425
Int. Cl. D04h 1/04
U.S. Cl. 161—150                                                       2 Claims

ABSTRACT OF THE DISCLOSURE

The invention relates to a bonded nonwoven sheet of randomly distributed continuous polyester filaments, said sheet having a net irreversible thermal shrinkage in the lengthwise and widthwise directions of between about 1.2 and 5% when heated to about 170° C. and cooled. The sheet is used as a reinforcing layer in a foamed rubber carpet underlay.

BACKGROUND

Sponge rubber (i.e., foamed rubber) carpet underlays have been prepared for many years by processes similar to those disclosed by Harwin et al. in U.S. 2,740,739. In Harwin et al. an open-mesh reinforcing fabric or scrim is affixed to a sponge rubber layer to form a carpet underlay. The scrim is affixed to the rubber during the blowing and vulcanization step when a series of porous bulges form in the rubber and penetrate the interstices of the open mesh febric to effect mechanical or "key-locking" engagement with the reinforcing fabric. Scrims of treated jute or cotton are commonly used.

Although scrim-reinforced carpet underlays have had considerable commercial success, they nevertheless have several undesirable features. Among these are (a) the tendency of the scrim to unravel or fray, (b) the problem in butt joining, (c) the difficulty in sliding the carpet over the underlay, and (d) the directionality of the strength characteristics of the underlay. These shortcomings as well as others, are discussed in British Pat. 1,074,996, which suggests substitution of a specific nonwoven fabric for the open-mesh scrim as reinforcement for the sponge rubber.

A non-woven fabric, different from that described in British 1,074,996, is disclosed by Kinney in U.S. Pat. 3,341,394. The Kinney nonwoven is made of continuous organic polymeric filaments which are disposed in a random configuration throughout the structure. Processes for manufacture of the nonwovens are disclosed in Kinney, U.S. 3,338,992 and Knee, U.S. 3,402,227. A particularly useful embodiment of the Kinney product comprises a nonwoven fibrous sheet of 80% to 90% by weight polyethylene terephthalate fibers and 20% to 10% by weight binder fibers of a polyester copolymer. An especially desirable sheet is obtained when the binder fibers are composed of a copolymer derived from ethylene glycol and a mixture of 80 mol percent terephthalic acid and 20 mol percent isophthalic acid. The nonwoven sheet prepared from this blend of polyester fibers is heated to fuse the copolymer fibers, which, upon cooling, bond the entire structure together. In addition to isotropic properties of high tear and high tensile strengths, the fabric is also hydrophobic, stable, and resistant to rot and mildew. Thus, this embodiment of a Kinney nonwoven sheet has many of the characteristics especially desired for a sponge rubber carpet underlayment reinforcement and facing.

When bonded fabrics of the above-described type are combined with a sponge rubber layer via conventional techniques, the final laminate may contain unsightly and weakening sags, wrinkles and depressions in the facing. The object of the process of this invention is to overcome these problems.

SUMMARY OF THE INVENTION

In the process of the present invention a sponge rubber carpet underlayment faced and reinforced with a nonwoven fabric is prepared by forming a foamable and curable rubber layer, heating the layer to a temperature of between about 90 and 150° C., combining the heated layer at this temperature, $T_{contact}$ or $T_c$, with a specified nonwoven fabric in a substantially flat condition, and then heating further to about 170 to 190° C. to effect foaming and curing of the rubber as well as adhesion of the rubber to the fabric. It has been found that a superior underlayment is obtained in the above process through use of a nonwoven fabric that begins to shrink at a temperature of about 80° C. and continues to shrink gradually with increase in temperature, but does not exhibit maximum shrinkage until heated to about $T_c$ or above. In addition, the nonwoven fabric must achieve a net irreversible thermal shrinkage in the lengthwise and widthwise directions of between about 1.2 and 5% when heated to about 170° C. and subsequently cooled, all as defined in greater detail below. This invention is also directed to a nonwoven fabric of the type described above comprising synthetic organic fibers particularly the aforementioned polyester fibers, which have a temperature of maximum heat-releasable shrinkage of greater than about 90° C. when measured in the manner prescribed herein below, and have a net irreversible thermal shrinkage of between about 1 and 4%.

DETAILED DESCRIPTION OF THE INVENTION

The process of this invention involves the conventional preparation of a corrugated, foamable and curable rubber layer, to which is laminated the specific facing material of this invention.

The elastomer used to form the sponge rubber layer can be of the usual types, such as natural, reclaimed or synthetic rubber, polyvinylchloride and vinyl chloride copolymers, polyurethane, and so forth. The particular blowing or foaming agents, as well as the curing or vulcanizing agents suited for the particular elastomer are well known in the trade. These agents are usually calendered into the elastomers during the preparation of the foamable and curable rubber layer. Binders may also be added optionally to the elastomer or to the elastomer surface in order to assist subsequent adhesion of the rubber to the facing and reinforcing fabric.

The prepared rubber layer is then heated on a wide mesh wire screen to a temperature $T_c$, usually between about 90 and 150° C. By the time the uncured rubber has reached this temperature, it has sagged into the interstices of the wire screen. At this point a nonwoven fabric of this invention is laid flat atop the layer of uncured rubber, so that contact is made between the non-sagged portions of the rubber and the fabric. To assure intimate contact for strong subsequent adhesion of the fabric to the rubber, a second wire belt may be placed atop the fabric to provide slight pressure. The assembly of belts, rubber and facing is then heated further to between about 170 to 190° C. During this heating, the facing is pressed into the rubber by the upper belt and by the rubber itself, which increases in thickness as it foams and cures due to the heat treatment. During the combining and further heating step, shrinkage occurs in the facing fabric due to a release of strains previously incorporated in the nonwoven. The laminate emerging from the heater is then cooled. The nonwoven face fabric is smooth and can be printed upon readily.

The preferred nonwovens of this invention are of the

Kinney type (U.S. 3,341,394) which are prepared by the process of Example III of Knee, U.S. 3,402,227 and then treated as defined herein to instill the desired properties. The nonwoven fabrics contain randomly distributed continuous filaments of polyethylene terephthalate amounting to about 88% by weight of the fabric and copolymer binder amounting to about 12% by weight of the fabric. The copolymer is 80/20 poly(ethylene terephthalate)/poly(ethylene isophthalate). This random web is then bonded at about 235° C. at a slight pressure (~½ p.s.i.). In a preferred bonding apparatus, hot air flows through the nonwoven fabric while the nonwoven fabric is supported between fabric belts; however other equivalent bonders which are well known in the art may be used.

The nonwoven fabric prepared as above is then cooled to room temperature and subsequently (1) stretched simultaneously between about 1.2 and 5% in length and width, (2) heated to about 135° C., (3) cooled again to room temperature and then (4) released from stretching tension. As a result of this treatment, the nonwoven fabric will begin to shrink at about 80° C. and continue to shrink gradually with increasing temperature, reaching maximum shrinkage at about 135° C. Continued heating to about 170° C. and subsequent cooling to room temperature produces a net irreversible shrinkage which is approximately equivalent to the amount of stretch, i.e., between about 1.2 and 5% in length and width. Devices for producing the required stretch are well known in the art and include for example, tenters, canted rolls and bowed-bar devices.

Other stretching and heating procedures may be employed. For example, a tenter can be used to stretch the nonwoven fabric as it emerges hot from the bonder and hold it in the stretched condition until it cools. Such a heat-, stretch-, and then cool-treatment imparts a net irreversible thermal shrinkage.

Nonwoven fabrics that do not possess the desired heat-releasable shrinkage characteristics (i.e., net irreversible thermal shrinkage of between about 1.2 and 5% in length and width dimensions and a temperature of maximum shrinkage that is at least equal to the temperature at which the fabric and the sponge rubber are to be initially joined) are not satisfactory in the process of this invention. With less than about 1.2% net irreversible thermal shrinkage, sags, depressions or wrinkles can result in the facing of the sponge rubber carpet underlayment product. High net irreversible thermal shrinkage, of greater than about 5%, can result in rubber distortion and is less economical because of the loss in area available for utilization as facing. When the temperature of maximum shrinkage is lower than the temperature at which the rubber layer and the facing initially make contact in the carpet underlayment process, depressions, sags, or wrinkles can form, even if the net irreversible thermal shrinkage is within the desired range.

DEFINITIONS AND TEST PROCEDURES

By net irreversible thermal shrinkage as used herein is meant the percent decrease in linear dimensions that occurs in a nonwoven fabric when the fabric is heated for at least 30 seconds at about 170° C. and then cooled. The test may be run as follows. A 50 x 50 cm. specimen of the nonwoven fabric is cut. Two marks, 40 cm. apart, are made in each of the lengthwise and widthwise dimensions of the fabric from which the sample was taken. The sheet is heated to about 170° C., held at that temperature for at least 30 seconds, and then cooled to room temperature. The distance between the two marks is remeasured. The percentage reduction in length is termed net irreversible thermal shrinkage. If it is desired to measure irreversible thermal shrinkage in only one fabric direction at a time, a relatively narrow test specimen, cut in the direction of interest, may be used (e.g., 2.5 cm. x 41 cm.).

The method by which the net irreversible thermal shrinkage of the filaments or fibers of the nonwoven facing fabric may be determined is as follows. Five samples measuring about one foot by one foot are cut from the facing fabric so that the edges of the squares are parallel to the widthwise (cross-machine, XD) or lengthwise (machine, MD) direction of the facing fabric. Individual filaments are then extracted from each square by making multiple cuts with a razor blade, parallel to the MD edge of the square, about three inches long and ⅛ to ¼ inch apart. The fibers or filaments that are loosened by this procedure represent filaments or fibers ostensibly oriented in the widthwise (XD) direction. This procedure is repeated, but the cuts are now made parallel to the XD edge of the square. This loosens filaments or fibers ostensibly oriented in the lengthwise (MD) direction. At least forty XD and forty MD filaments or fibers are extracted from each of the five squares. Thus, a total of 400 fibers or filaments are used in this test. The extracted fibers or filaments, which are identified as to MD or XD orientation, are then mounted between two glass microscope slides. One of the slides is flat; the other is a cavity slide (e.g., made by New York Laboratory, 76 Varick St., New York, N.Y., Catalog No. 63065). Each slide contains ten filaments or fibers, which are mounted so that they reside in the air space provided by the cavity. Each slide is then mounted on a Projectina, made by Projectina-Optik, Altstaetten-Sg., Switzerland. The length of each filament or fiber is measured. The slides are then placed in an oven at 60° C. for 15 minutes, removed and allowed to cool. Each slide is then replaced on the Projectina and the filament or fiber lengths remeasured. The present shrinkage of each fiber of filament is then calculated.

The process is repeated at 80° C., 100° C., 120° C., 130° C., 140° C. and 170° C. The same slides with the same filaments or fibers are used at each temperature. If only the net irreversible thermal shrinkage at 170° C. is desired, only that temperature is used. The average for all the MD-oriented filaments or fibers is then calculated as is the average for all the XD-oriented ones.

The temperature of the maximum heat-releasable shrinkage, $T_m$, i.e., the temperature at which maximum shrinkage of the nonwoven fabric is reached is determined by Test A as follows:

Samples (e.g., 2.5 x 41 cm.) of the nonwoven fabric may be cut from the length and width dimensions of the fabric, hung from an end alongside a calibrated marker and placed in an oven. The strips are protected from wind currents by means of a transparent sleeve. The temperature of the samples is raised at a rate of about 30° C. per minute. The length of the samples is observed through a window and recorded at about 10° C. intervals. Samples cut from nonwoven fabrics of the invention will begin to shrink at about 80° C. and continue to shrink as the temperature rises until a temperature is reached where shrinkage stops and expansion begins. This temperature is the temperature of maximum heat-releasable shrinkage, $T_m$. For accuracy, the value of $T_m$ determined by Test A was actually obtained by a plot of temperature vs. percent change in sample length. The temperature, read off the curve at minimum sample length, constitutes $T_m$.

Another method, Test B, of determining $T_m$ of the facing involves successive measurements of the thermal shrinkage at progressively higher temperatures, e.g., between about 80° C. and 170° C. A measured initial length of sample is heated in an oven to a given temperature, then cooled and remeasured to obtain the final length. The percent shrinkage, $S_{Ti}$, at a given temperature, $T_i$, is then calculated. This procedure is repeated at successively higher temperatures until a seres of values is obtained. A plot is then made of percent length change, $S_{T-L}$ versus temperature $T_i$ with values determined by means of the following relationship:

$$S_{T-L} = S_{Ti} + (T_i - 30) \, c$$

where $S_{Ti}$ = percent net irreversible thermal shrinkage when heated to temperature, $T_i$ and then cooled to 30° C., always negative $S_{T-L}$ = percent length change when heated to temperature, $T_i$ $T_i$ = temperature in ° C.

c = coefficient of thermal expansion, percent change per ° C., always positive.

The term ($T_i$ − 30) c accounts for the normal thermal expansion that occurs between $T_i$ and 30° C. The c factor of course depends on the particular synthetic organic fibers which make up the web; in the case of polyester fibers c equals about $10^{-2}$ percent per ° C. The temperature, determined from the curve at which the absolute value of $S_{T-L}$ is greatest, constitutes $T_m$.

In accordance with this invention, nonwoven fibrous sheets of a variety of synthetic organic fibers may be combined with the sponge rubber layer to produce underlayment provided the fabric possesses the hereindefined shrinkage characteristics and the process of manufacture described herein is followed. Thus, bonded nonwoven sheets of between about 0.5 and 2 oz. per square yard that achieve a net irreversible thermal shrinkage in the lengthwise and widthwise directions of between about 1.2 and 5% when heated to about 170° C. and begin to shrink at about 80° C. may be employed. Such sheets comprising randomly distributed continuous polyester filaments are preferred, particularly those containing at least about 80% by weight of polyethylene terephthalate.

EXAMPLES 1–24

These examples illustrate the criticality of using nonwoven fabrics having the heat-releasable shrinkage characteristics required in this invention.

Polyester nonwovens of randomly arrayed continuous filaments of 1.2 oz./yd.² unit weight are made using a web-laydown apparatus having spinning positions as shown schematically in FIG. 10 of Knee, U.S. 3,402,227. Poly (ethylene terephthalate) (30 relative viscosity) is spun from a spinneret with 250 holes (trilobal 0.005 in. diameter x 0.015 in. long) at a rate of 44.7 lb./hr., quenched with 120 c.f.m. of air (18° C.) in a radial quench chimney, charged to a level of 46,000 e.s.u. per square meter of filament surface, and combined with 50 copolymer filaments on draw rolls having a surface speed of 3,330 yd./min. The copolymer, 80/20 poly(ethylene terephthalate)/poly(ethylene isophthalate) (30 relative viscosity), is spun at a rate of 6.3 lb./hr. to give 12.4% by weight of binder in the product, and is quenched by 42 c.f.m. of air (18° C.) in a cross-flow quench chimney. The copolymer filaments are charged to a level of 9200 e.s.u. per square meter of filament surface before being combined with the homopolymer filaments. The combined ribbon of filaments is stripped from the draw rolls by a 5 in. wide slot jet device supplied with 50 c.f.m. of air. The jet device is positioned so that the long dimension of the slot is at an angle of 70.5° with the direction of movement of a foraminous belt-receiver that is located 21¼ in. from the exit of the jets. The jet has a diffuser section at the exit end which spreads the ribbon of filaments to give an area of deposition which forms a 20-in. wide web as the receiver moves. By combining spinning positions so that the center points of the slot jets are 15 in. apart on a line 19.5° to the direction of movement of the receiver, a wide web with about 75% overlap of laterally-adjacent areas of deposition is formed. The suction air flow is about 2000 c.f.m. per position or about 40 times the jet air flow per position. The filaments in these collected nonwoven fabrics possess no spontaneous elongation. The nonwoven fabric is then bonded between screens at about 235° C. while under restraint of about ½ p.s.i. in a hot air bonder. The fabric is cooled to room temperature and then given a variety of stretch, heat, cool and release treatments to obtain a range of samples having varying degrees of lengthwise (MD) and widthwise (XD) heat-releasable shrinkage.

The treatment comprises stretching the fabric MD and XD on a tenter frame, heating the fabric to a given temperature while under stretching tension, cooling the fabric to 60° C. or below, and then releasing the tension. The percent stretch MD and XD for the fabric of each example is equal to percent shrinkage in the same direction given in the following table and the temperature to which the fabric is heated equals the listed $T_m$ for that example.

The nonwoven polyester fabrics are then laminated to a rubber layer to form sponge rubber carpet underlayments faced and reinforced by the nonwoven fabrics. A rubber layer containing conventional curing and foaming agents is prepared and heated on a wide mesh wire screen. The heated uncured rubber sags into the interstices of the wire screen. The nonwoven fabric while maintained flat

TABLE I

| Example No. | Percent shrinkage in facing [a] | | $T_m$ [b] ° C. | Appearance of product made with different contact temperatures, $T_c$ [e] | | |
|---|---|---|---|---|---|---|
| | XD [c] | MD [d] | | $T_c$ = 93° | $T_c$ ~ 100° C. | $T_c$ = 133° C. |
| 1 | 0.2 | 0.1 | (f) | | MD sag, XD wrinkle | |
| 2 | 0.3 | 1.4 | (f) | | MD sag | |
| 3 | ~0 | ~0.5 | (f) | | MD sag, XD wrinkle | |
| 4 | 1.1 | 1.1 | 110 | MD sag and wrinkle | | MD sag and wrinkle. |
| 5 | 1.6 | 0.9 | 110 | do | | Do. |
| 6 | 2.3 | 1.5 | 120 | Satisfactory | | Do. |
| 7 | 3.4 | 2.2 | 110 | do | | Do. |
| 8 | 4.8 | 2.4 | 110 | do | | Do. |
| 9 | 2.1 | 1.5 | ~115 | | Satisfactory | |
| 10 | 1.3 | 3.4 | 110 | Satisfactory | | MD sag and wrinkle. |
| 11 | 1.8 | 4.8 | 120 | do | | Do. |
| 12 | 2.7 | 1.3 | 130 | MD sag, rubber distort | | Marginal. |
| 13 | 2.0 | 1.5 | 130 | Satisfactory | | MD sag and wrinkle. |
| 14 | 1.1 | ~1 | ~120 | | Satisfactory | |
| 15 | 1.8 | ~0 | ~120 | | XD wrinkle | |
| 16 | 2.3 | ~0 | ~120 | | XD wrinkle, rubber distort | |
| 17 | 2.0 | 1.8 | 110 | Satisfactory | | MD sag, rubber distort. |
| 18 | 1.8 | 1.5 | ~130 | | | Satisfactory. [g] |
| 19 | 1.6 | 1.6 | 130 | Satisfactory | | Satisfactory. |
| 20 | 2.8 | 1.4 | 150 | do | | Do. |
| 21 | 3.4 | 0.3 | ~140 | | XD wrinkle, rubber distort | |
| 22 | 2.0 | 1.8 | 150 | Satisfactory | | |
| 23 | 0.7 | 2.6 | 150 | MD sag and wrinkle, rubber distort | | |
| 24 | 1.4 | 2.0 | 140 | Satisfactory | | |

[a] Percent shrinkage in facing is the net irreversible thermal shrinkage measured at about 170° C.
[b] $T_m$ is the temperature of maximum heat-releasable shrinkage measured in the XD. The MD $T_m$ is always equal to or greater than the XD $T_m$. Measurements for Examples 1, 2, 3, 9, 14, 15, 16, 18 and 21 were by Test A, the others by Test B.
[c] XD refers to measurements taken in the cross-machine direction or widthwise dimension of the facing.
[d] MD refers to measurements taken in the machine direction or lengthwise dimension of the facing.
[e] Defects in the appearance of the product are listed as sags (or depressions) and wrinkles in the MD and XD dimensions of the facing and as distortions in the sponge rubber layer. The wrinkles in the facing may be fused. XD defects also include those appearing when viewing the facing in a diagonal direction across the sheet.
[f] Do not exhibit a $T_m$ above 100° C.
[g] The $T_c$ for this example is about 135° C.

is brought into contact with the non-sagged portions of the rubber, which is at the contact temperature $T_c$ that is indicated in Table I above. The rubber and facing are then heated to about 190° C. to foam and cure the rubber and adhere the fabric to the rubber. The product is then allowed to cool and is wound up on a roll as carpet underlayment. Each underlayment sample is at least 20 yards long and between 58 and 116 inches wide. The results of these tests are summarized in Table I. It is concluded from these results that when $T_m$, the temperature of maximum heat-releasable shrinkage, is at least equal to $T_c$, the temperature of initial facing-to-rubber contact, (1) no widthwise (cross-machine direction) wrinkling, sagging or deformation of the facing will occur if the lengthwise (machine direction) net irreversible thermal shrinkage is between 1.2 and 5% and (2) lengthwise (machine direction) wrinkling, sagging or deformation of the facing will not occur when widthwise (cross-machine direction) net irreversible thermal shrinkage is between 1.2 and 5%. In addition, deformation of the rubber generally does not occur when $T_m$ is about equal to or greater than $T_c$ and both machine and cross-machine direction net irreversible thermal shrinkages are betwen about 1.2 and 5%.

EXAMPLES 25 AND 26

These examples illustrate preferred nonwoven facing materials of this invention. Two samples of random nonwoven facing fabrics are made of continuous polyester filaments as in the preceding examples. The heat-releasable shrinkage characteristics of these fabrics and the filaments of which these fabrics are composed are summarized in Table II below.

TABLE II.—FABRIC VS. FILAMENT SHRINKAGE CHARACTERISTICS

| Example | $T_m$, °C. | Net irreversible thermal shrinkage at 170° C., percent | | | |
|---|---|---|---|---|---|
| | | Fabric | | Filaments | |
| | | MD [1] | XD [2] | MD [1] | XD [2] |
| 25 | 135 | 1.0 | 1.5 | 1.0 | 1.5 |
| 26 | 100 | 5.1 | 1.7 | 2.2 | 3.7 |

[1] Machine direction.
[2] Cross-machine direction.

The fabric shrinkage characteristics are determined on samples taken immediately adjacent to the samples from which the filaments were removed. From the results summarized above, it is concluded that preferred nonwoven fabrics of this invention have temperatures of maximum heat-releasable shrinkage of at least 90° C. and filaments or fibers having net irreversible thermal shrinkages of between about 1 and 4% in both the machine and cross-machine directions.

What is claimed is:
1. A bonded nonwoven sheet of randomly distributed continuous polyester filaments at least 80% by weight of which are polyethylene terephthalate, said fabric exhibiting a net irreversible thermal shrinkage in the lengthwise and widthwise directions of between about 1.2 and 5% when heated to about 170° C. and cooled and having a maximum heat releasable shrinkage temperature of greater than about 90° C.

2. The product of claim 1 wherein the filaments of said fabric have a net irreversible thermal shrinkage of between about 1 and 4%.

References Cited

UNITED STATES PATENTS 2,618,012   11/1952   Milne _____ 264—289
3,341,394   9/1967   Kinney _____ 161—92

ROBERT F. BURNETT, Primary Examiner

L. M. CARLIN, Assistant Examiner

U.S. Cl. X.R.

161—170